United States Patent [19]

Hallay

[11] Patent Number: 4,835,024
[45] Date of Patent: May 30, 1989

[54] DECORATIVE ARTICLE FOR A MAGNETIZABLE SURFACE

[76] Inventor: Gary K. Hallay, 1915 Howard St., Port Huron, Mich. 48060

[21] Appl. No.: 142,016

[22] Filed: Jan. 11, 1988

[51] Int. Cl.⁴ .............................................. A41G 1/00
[52] U.S. Cl. ........................................ 428/24; 40/600; 248/27.8; 248/537; 428/31; 428/900
[58] Field of Search ............. 40/600; 248/27.8, 537; 362/122; 428/24, 25, 26, 31, 900

[56] References Cited

U.S. PATENT DOCUMENTS

| | | | |
|---|---|---|---|
| 2,069,942 | 2/1937 | Cohen | 428/31 X |
| 2,277,981 | 3/1942 | Horton | 428/31 X |
| 2,764,122 | 9/1956 | Irvin | 428/31 X |
| 3,082,982 | 3/1963 | Moskowitz | 428/900 X |
| 3,088,295 | 5/1963 | Haines | 428/24 X |
| 3,121,131 | 2/1964 | Blume, Jr. | 428/900 X |
| 3,131,897 | 5/1964 | Shelker et al. | 248/27.8 |
| 3,148,856 | 9/1964 | Orlando | 428/31 X |
| 3,164,352 | 1/1965 | Weaver | 428/900 X |
| 3,574,901 | 4/1971 | Nogue et al. | 428/24 X |
| 3,819,458 | 6/1974 | Kinderman et al. | 428/12 X |
| 3,955,786 | 5/1976 | Duddy | 248/537 |
| 4,047,802 | 9/1977 | Pieters | 428/31 X |
| 4,058,335 | 11/1977 | Abe | 248/206.5 X |
| 4,287,676 | 9/1981 | Weinhaus | 40/600 X |
| 4,294,036 | 10/1981 | Wion | 428/900 X |
| 4,340,625 | 7/1982 | Willinger | 428/17 |
| 4,363,837 | 12/1982 | Weitz | 428/26 |
| 4,574,726 | 3/1986 | Sullivan | 40/600 X |
| 4,633,215 | 12/1986 | Anders et al. | 40/610 X |

*Primary Examiner*—Henry F. Epstein
*Attorney, Agent, or Firm*—Remy J. VanOphem

[57] ABSTRACT

A decorative article for releasable attachment to a magnetizable surface, including a base of magnetized sheet material and a projection member attached to the base which serves to hold an ornament on the base in an assembled state. The base is constructed of a flexible, resilient magnetic sheet. The projection member includes a connection member for attaching the projection member to the base and an integral upstanding projection. A sleeve having a head is received onto the upstanding projection. Interposed the head of the sleeve and the base is an ornament, held in an assembled state by the interaction of the base, the head of the sleeve and the upstanding projection. Apertures are provided in the base to ensure an absence of suction when the base is removed from the magnetizable surface.

6 Claims, 1 Drawing Sheet

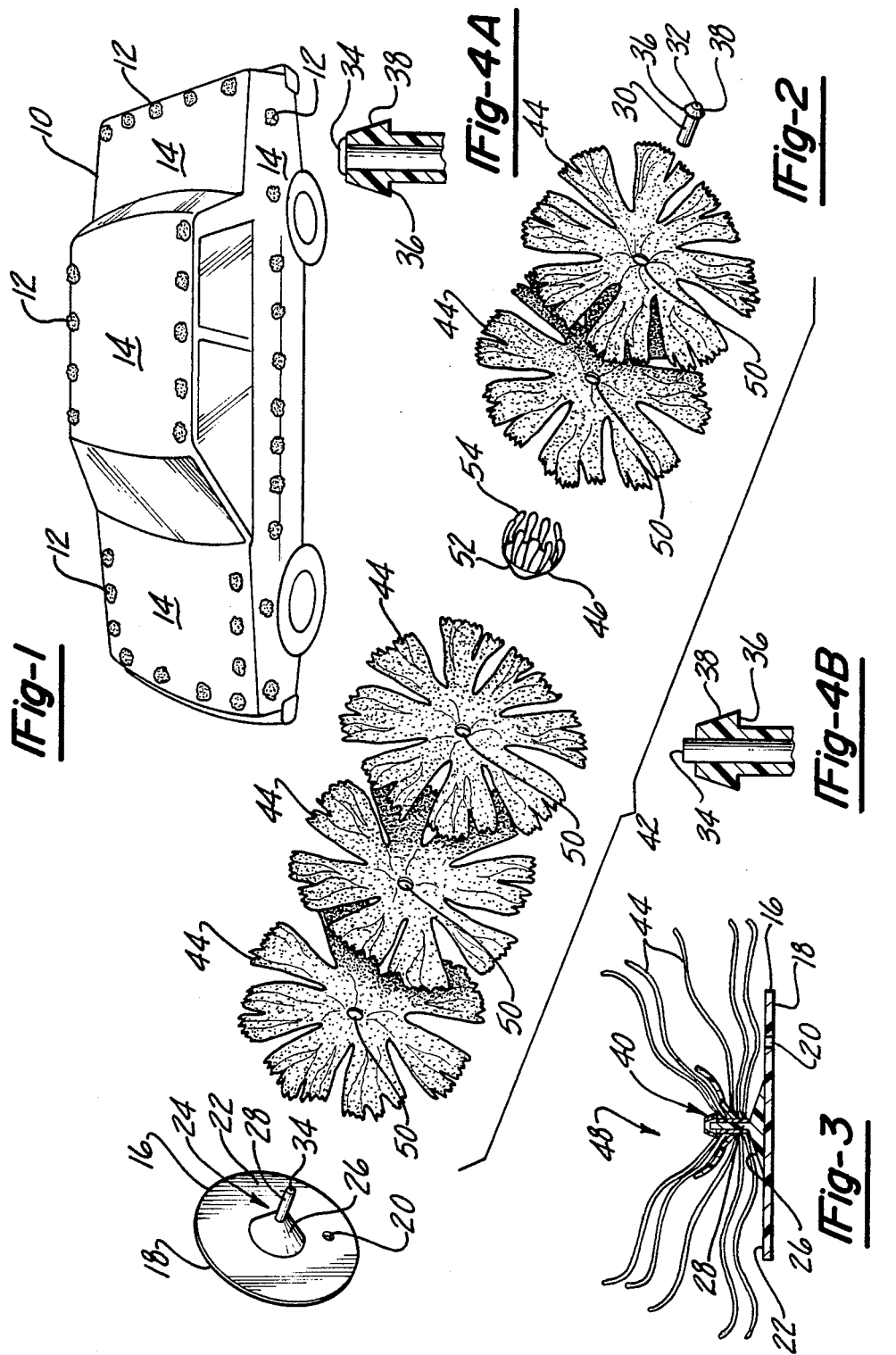

DECORATIVE ARTICLE FOR A MAGNETIZABLE SURFACE

BACKGROUND OF THE INVENTION

1. FIELD OF THE INVENTION

The present invention relates to articles that are removably attachable to surfaces, and particularly to a decorative article including an ornament, the decorative article being removably attachable to a surface by magnetism.

2. DESCRIPTION OF THE PRIOR ART

It is frequently desirable to temporarily decorate surfaces for special occasions. Particularly in this regard, it has become customary to decorate automobiles for weddings by the use of a number of ornamental artificial carnation flowers. Commonly these flowers are made of plastic, fabric or paper and are attached to the car by adhesive tape. The adhesive tape, however, is generally ineffective to hold the flower at high speeds or in wet weather. Further, the adhesive tape has the significant disadvantage of, in the least, leaving a residue on the paint finish and, at worst, removing some of the paint when it is removed. In any event, these flowers have generally single use lifetimes, which adds to their cost.

There remains in the art the longstanding need to provide a simple, effective, reusable and non-marring decorative article composed of an ornament and mounting means therefor of the type hereinabove described.

In the prior art, there have been numerous solutions forwarded to provide mounting structures for the temporary attachment of articles to surfaces.

One class of mounting solution involves the use of a clamp which attaches to a specific location on the surface. An example of such a structure is U.S. Pat. No. 2,764,122 to Irvin which discloses a funeral flag attached to a base having a clamp. The clamp is removably attachable to the rain gutter of a motor vehicle. Because of the specificity of the attachment location, such a mounting solution is unacceptable for decorative articles of the type hereinabove described.

A second class of mounting solution involves the use of suction cups which employ vacuum to hold an article onto a smooth surface. An example of such a structure is U.S. Pat. No. 2,277,981 to Horton, which discloses a flag mounted to a channeled extension that is integral with a suction cup. This solution suffers from the problem that the vacuum in the suction cup is generally not well maintained, resulting in eventual release of the suction cup from the surface. U.S. Pat. No. 2,069,942 to Cohen is an example of an improved suction cup, having an annular groove that improves maintenance of the vacuum. U.S. Pat. No. 3,148,856 to Orlando is an example of an improved suction cup structure in which a magnet is included for attractively interacting with a smooth magnetizable surface, thus, assisting the maintenance of the suction cup vacuum. While suction cup based mounting devices can be located anywhere on a flat, smooth surface, they suffer from the need to include a rather large base structure which includes the suction cup and an integral mounting device for the article to be attached thereto. Consequently, suction cup mounting devices are not suited to replace adhesive tape for decorative articles as hereinabove described.

A third class of mounting solution involves the use of magnetic materials which magnetize a surface to which an article is to be attached, resulting in a magnetic attraction therewith. There are numerous examples of magnetic mounting devices. U.S. Pat. No. 3,082,982 to Moskowitz discloses a staff support having a staff holding base, to which is attached, in one plane, three projections, each having an end including a permanent magnet. U.S. Pat. No. 3,131,897 to Shelker et al discloses a base made of a rubberized sheet having magnetized particles therein, to which is attached a plurality of upstanding spines for holding a floral display. U.S. Pat. No. 3,955,786 to Duddy discloses a base having magnet members attached thereto on one side and a flag staff holder on the other side thereof. U.S. Pat. No. 4,058,335 to Abe discloses a magnetic mounting device which utilizes a magnetic sheet having a shape that causes a suction action when the magnetic sheet is attracted to a magnetizable surface. U.S. Pat. No. 4,287,676 to Weinhaus discloses an elastomeric material interposed a magnetizable surface and a magnet for improving frictional resistance to lateral forces. U.S. Pat. No. 4,574,726 to Sullivan discloses a distress signal device having a magnetized base to which is threadingly attached a flag staff. Finally, U.S. Pat. No. 4,633,215 to Anders et al discloses a distress signal device having a flag staff holder on one side of a base and a magnetized sheet attached to the other side of the base. While a magnetized mounting device which utilizes a sheet magnetized material may provide a mounting substitute for adhesive tape, there remains a problem of potential suction generated under the magnetized sheet which can cause difficult removal from the magnetizable surface. Indeed, certain of the prior art magnetic mounting devices cited hereinabove are structured to enhance suction.

In the prior art, there have also been numerous solutions forwarded to provide a fastener for mounting an article to a base. U.S. Pat. No. 3,088,295 to Haines discloses an ornament holder having a male pin fastener element and a female gripper fastener element which releasably grips the pin fastener element when inserted thereinto. U.S. Pat. No. 3,574,901 to Nogue discloses an ornament holder having a flange stud which fits into an internal cavity of an elastic material and is secured thereinto by an adhesively attached washer. U.S. Pat. No. 3,819,458 to Kinderman et al discloses a holder system for an ornamental article having a plurality of upstanding projections, spaced about a ring member, to each of which is attached a hollow tubular member that carries an ornament. Finally, U.S. Pat. No. 4,340,625 to Willinger discloses a cup-shaped base to which is interfitted an ornamental artificial plant. None of these fasteners teach a structure which can releasably hold a decorative article of the type hereinabove described to its base and simultaneously keep the decorative article in an assembled state.

While the above described prior art devices teach various solutions to particular mounting and fastening problems, there remains in the prior art the need to provide a decorative article of the type hereinabove described in which the fastening means holds the components of the decorative article in an assembled state relative to the base and the base holds the decorative article relative to a magnetizable surface without marring or generating suction with the magnetizable surface.

SUMMARY OF THE INVENTION

The present invention is a decorative article for releasable attachment to a magnetizable surface, particularly an automotive body panel. The decorative article has a base of magnetized sheet material which magnetically attracts the magnetizable surface, thereby releasably mounting the decorative article to the magnetizable surface. Attached to the base is a projection member having an upstanding projection. An ornament, such as an artificial flower, is held in an assembled state on the upstanding projection. At least one aperture is provided in the base to ensure an absence of suction when the base is removed from the magnetizable surface.

Accordingly, it is an object of the present invention to provide a decorative article which is releasably mountable to a magnetizable surface in a manner which will not mar the magnetizable surface, is resistant to displacement caused by forces parallel to the magnetizable surface and will not generate suction when removed from the magnetizable surface.

It is a further object of the present invention to provide a decorative article that retains an ornament in an assembled state at a predetermined location relative to the base of the decorative article.

It is yet an additional object of the present invention to provide a method for decorating a motor vehicle which is simple and easy to perform.

These and other objects, advantages, features, and benefits of the present invention will become apparent from the following specification.

BRIEF DESCRIPTION OF THE DRAWINGS

FIG. 1 is a perspective view showing the decorative article according to the present invention in operation on a motor vehicle;

FIG. 2 is an exploded perspective view of the decorative article according to the present invention;

FIG. 3 is a side view of the decorative article according to the present invention; and FIG. 4A and 4B are part detailed side views of a method according to the invention of fastening a sleeve to a projection member.

DETAILED DESCRIPTION OF THE PREFERRED EMBODIMENT

Referring now to the figures, FIG. 1 shows an automobile 10 having a plurality of decorative articles 12 mounted thereon. The automobile has magnetizable body panel surfaces 14. The decorative articles have a magnetized base which magnetically attracts the automobile body panel surfaces. While this environment of use is preferred, the foregoing description of the preferred embodiment is to be understood to be equally applicable to other types and forms of magnetizable surfaces, such as refrigerator doors.

FIG. 2 particularly shows the structure of the decorative article 12 of the present invention. A base 16, preferably having a circular shape, is made of a flexible magnetic sheet material of the type commonly known in the art. The base has a soft, nonabrasive resilient composition, such as an elastomer, the surface 18 of which will not mar painted surfaces and provides a substantial coefficient of friction with the magnetizable surface 14 such that the base will not move on the surface even when the decorative article 12 is located on the automobile 10 when it is traveling at express-way speeds. At least one aperture 20 is provided in the base 16. The aperture prevents suction from developing as the base is removed from the magnetizable surface 14. It is possible to omit these apertures in the event suction is not a concern. The other side 22 of the base may be painted or elastomer coated in a decorative manner.

Attached to the other side 22 of the base 16, in its geometric center, is a projection member 24. The projection member has preferably a connection member 26 that provides sufficient contact surface area for stable, strong attachment of the projection member to the base. The projection member 24 is attached to the base 16 by any conventional attachment means, such as gluing. Integral with the connection member is an upstanding projection 28. The upstanding projection is preferably of cylindrical shape and has a much smaller diameter than that of the connection member 26.

It is preferred to include a sleeve 30 having a central bore 32 which permits it to slide onto the projection member 24 at the upstanding projection 28. While the preferred embodiment shows the central bore through the entire sleeve, it is possible to use a bore which is blind at one end. As shown in FIGS. 4A and 4B, the end 34 of the upstanding projection is melted over the end 36 of the sleeve, thereby retaining the sleeve permanently on the upstanding projection. Alternatively, the sleeve may be adhesively attached to the upstanding projection after being inserted thereon. It is further possible to use a friction fit or a snap fit to retain the sleeve on the projection member. The sleeve has a head 38 located at the end 36 of the sleeve. The combination of the projection member 24, the head 38 of the sleeve 30 and the base 16 form a fastener 40 for an ornament which is more particularly understood by reference to Figure 3.

An ornament 42 is provided within the space interposed the base 16 and the head 38 of the sleeve 30. In the preferred embodiment, the ornament is composed of a plurality of artificial flower petals 44 and a petal shaping member 46, which together compose an artificial carnation flower 48. Centrally located apertures 50 and 52, are respectively provided in the artificial flower petals and the petal shaping member to allow them to insert onto the upstanding projection 28. The artificial flower petals are preferably made of silk because it is tear and water resistant, while the petal shaping member is preferably made of plastic. It will be seen from FIG. 3 that the petal shaping member 46 is located on the upstanding projection so that at least one artificial flower petal is on either side thereof. The petal shaping member 46 has extensions 54 which cause the artificial flower petals located farther from the base to be shaped in a full and flowerlike manner.

It will be clear to those skilled in the art that the artificial flower described hereinabove, which preferably has a sleeve 30 and petal shaping member 46, could be constructed without these components. Further, while an artificial flower ornament is disclosed in the preferred embodiment, it is presented herein by way of example and not by limitation.

In operation, a portion of the plurality of artificial flower petals 44 are inserted onto the sleeve 30 followed by the petal shaping member 46 and finally followed by the remaining petals of the plurality of artificial flower petals. The sleeve 30 is then placed onto the upstanding projection. The sleeve may or may not be thereupon affixed in place permanently.

The decorative article 12 formed by the foregoing steps is then placed on a magnetizable surface 14 at a desired location. To remove the decorative article 12 from the magnetizable surface the user can grab any one or more of the artificial flower petals 44 and then pull the decorative article in a direction away from the magnetizable surface 14. This is facilitated by the at least one aperture 20 in the base 16, which greatly reduces or eliminates any suction generated between the base and the magnetizable surface as the decorative article is removed therefrom.

To those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. A decorative article for a magnetizable surface, comprising:
    a base composed of a patch of magnetized, flexible thin sheet plastic material;
    a substantially rigid elongated projection member integrally joined to a central portion of one side said base to project outwardly therefrom;
    at least one flowery ornament member having an aperture therein, said aperture in said at least one ornament member being received on said projection member; and
    means adjacent said at least one ornament member for retaining said at least one ornament member on said projection member.

2. The decorative article of claim 1, wherein said projection member
    is attached to said base by a frustoconical mass surrounding said projection member and of cross-sectional diameter substantially greater than that of said projection member.

3. The decorative article of claim 1, further including a plurality of generally circular members each shaped as flower petals comprising said ornament member, each generally circular member having a central aperture received over said projection member.

4. The decorative article of claim 3, further comprising a sleeve having a central bore, said central bore of said sleeve being received on said projection member; said central aperture of said plurality of generally circular members being received on said sleeve.

5. The decorative article of claim 4 further including a flower shaping element for shaping at least some of said plurality of generally circular members, said flower shaping element having a plurality of radial extensions and having a central aperture to be received on said sleeve; said plurality of extensions being inclined away from said base and engaging the undersurface of one of said plurality generally circular members to push the periphery thereof away from said base and thereby push said at least some of said plurality of generally circular members into a fuller shape.

6. The decorative article of claim 5, wherein said base has at least one aperture extending through from one side to the other of said base for reducing suction during removal of said base from said magnetizable surface.

* * * * *

UNITED STATES PATENT AND TRADEMARK OFFICE
CERTIFICATE OF CORRECTION

PATENT NO. : 4,835,024
DATED : May 30, 1989
INVENTOR(S) : Gary K. Hallay

It is certified that error appears in the above-identified patent and that said Letters Patent is hereby corrected as shown below:

Column 5, line 25, before "said" insert ---- of ----.

Column 6, line 24, after "plurality" insert ---- of ----.

Signed and Sealed this

Twentieth Day of November, 1990

Attest:

HARRY F. MANBECK, JR.

*Attesting Officer*   *Commissioner of Patents and Trademarks*